Nov. 29, 1966 J. L. E. BALDWIN 3,288,924

MAGNETIC TAPE APPARATUS

Filed July 23, 1963 6 Sheets-Sheet 1

INVENTOR
JOHN LEWIS EDWIN BALDWIN
BY Hane and Nydick
ATTORNEYS

INVENTOR
JOHN LEWIS EDWIN BALDWIN
BY Hane and Nydick
ATTORNEYS

Nov. 29, 1966 J. L. E. BALDWIN 3,288,924

MAGNETIC TAPE APPARATUS

Filed July 23, 1963 6 Sheets-Sheet 3

INVENTOR
JOHN LEWIS EDWIN BALDWIN
BY Hane and Nydick
ATTORNEYS

INVENTOR
JOHN LEWIS EDWIN BALDWIN
BY Hane and Nydick
ATTORNEYS

INVENTOR
JOHN LEWIS EDWIN BALDWIN
BY Haseltine and Nydick
ATTORNEYS

INVENTOR
JOHN LEWIS EDWIN BALDWIN
BY Hane and Nydick
ATTORNEYS

United States Patent Office 3,288,924
Patented Nov. 29, 1966

3,288,924
MAGNETIC TAPE APPARATUS

John Lewis Edwin Baldwin, Croydon, Surrey, England, assignor to Rank-Bush Murphy Limited, London, England, a British company Filed July 23, 1963, Ser. No. 297,102
Claims priority, application Great Britain, July 24, 1962, 28,432/62
11 Claims. (Cl. 178—6.6)

Figure 1:
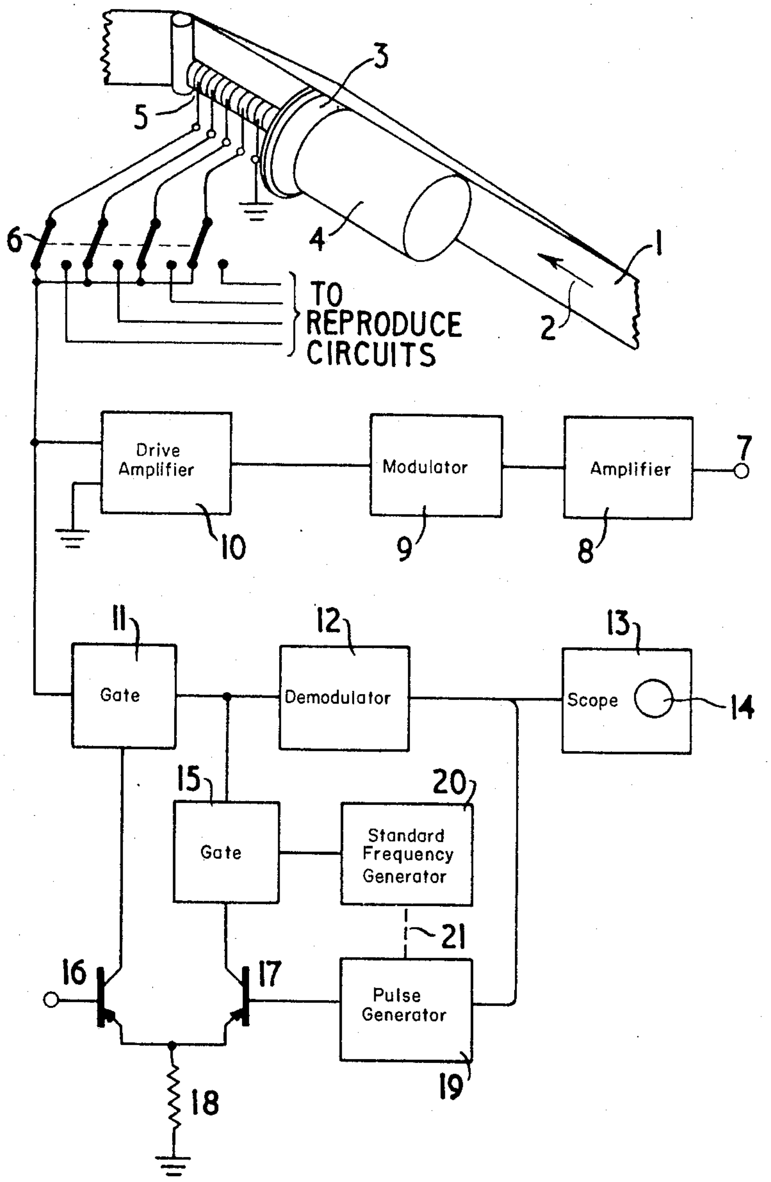

This invention relates to apparatus for recording signals upon or reproducing signals from magnetic tape records and is especially concerned with apparatus for the recording of signals upon magnetic tape as a succession of discontinuous tracks extending transversely of the tape and with apparatus for the reproduction of signals from such tape records. In a known system of this kind the tracks lie almost perpendicular to the length of the tape and are recorded or reproduced by scanning the tape with a plurality of transducer heads carried upon the circumference of a revoluble member rotating about an axis parallel to the direction of movement of the tape.

In reproducing signals so recorded the signals from each head in turn are applied to an output channel to reconstitute the television signal. It is found in practice that difficulties arise owing to variations with time in the performance of the signal processing circuits through which signals to be recorded are fed to the transducer heads or through which the signals recovered from the tape are restored to their original form. To overcome these difficulties it is desirable to be able to continuously adjust the signal processing circuits to predetermined characteristics.

It is therefore an object of the present invention to provide magnetic tape apparatus for recording and reproducing signals by which adjustment of signal processing circuits is facilitated.

Specifically, it is an object of the invention to provide signal recording apparatus in which desired signal levels in a frequency-modulated signal are rendered visible on the screen of a monitoring oscilloscope.

It is a collateral object of the invention to provide apparatus for reproducing signals from magnetic tape in which means are included for adding in intervals of the reproduced signal auxiliary signals having predetermined characteristics.

Specifically, it is an object of the invention to provide means whereby signals having frequencies corresponding to the peak white level and another level of a television signal may be added to a frequency-modulated signal reproduced from magnetic tape.

It is a further collateral object of the invention to provide head switching circuitry for use in magnetic tape apparatus whereby the injection of an auxiliary signal into the signal reproduced from the tape may be facilitated.

Figure 2:
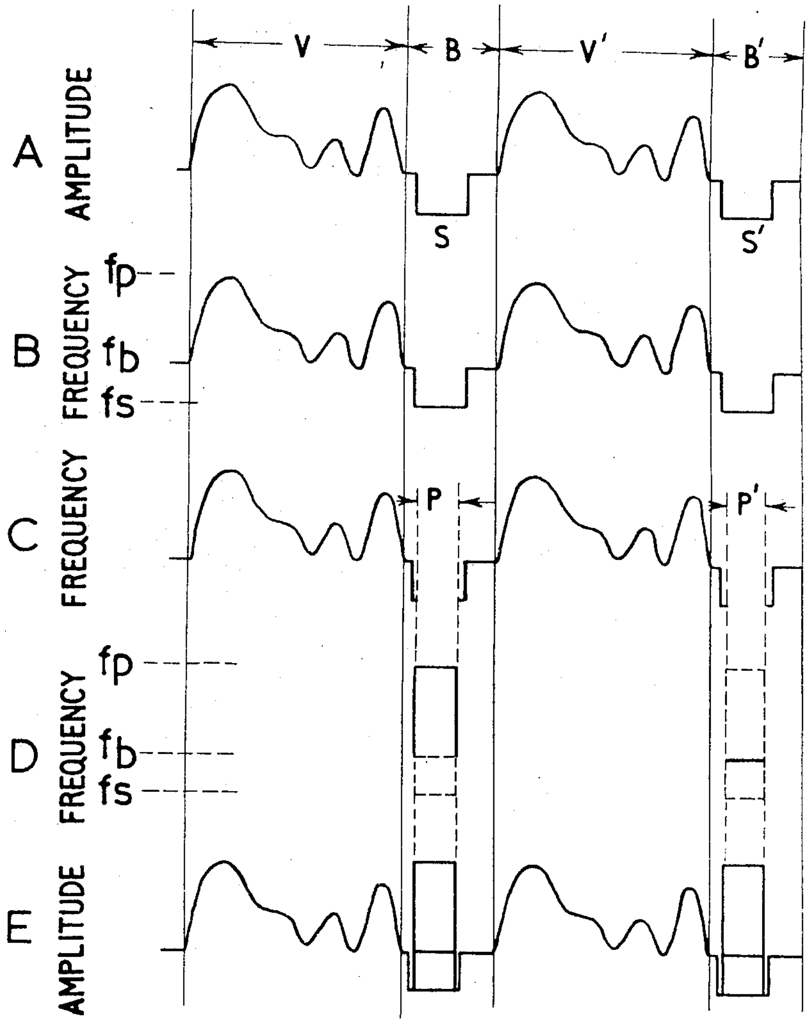
Figure 3:
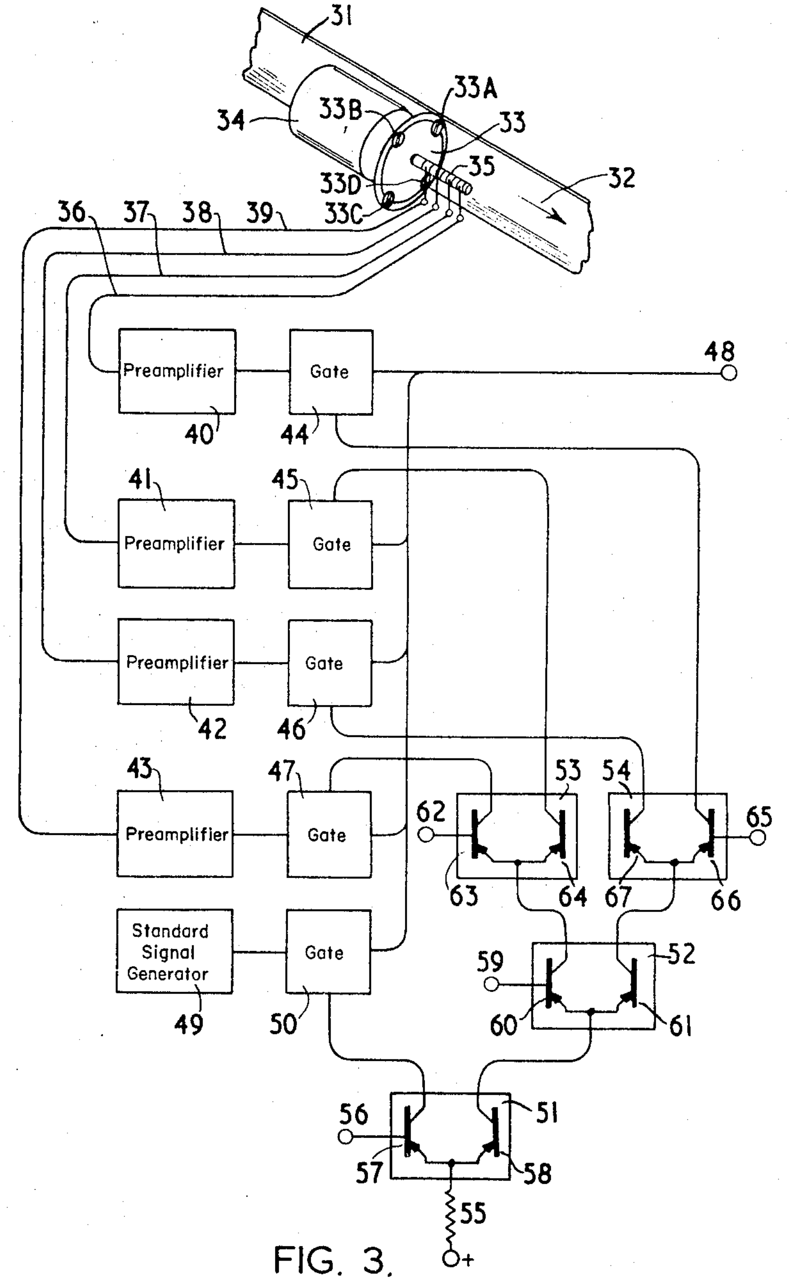
Figure 4:
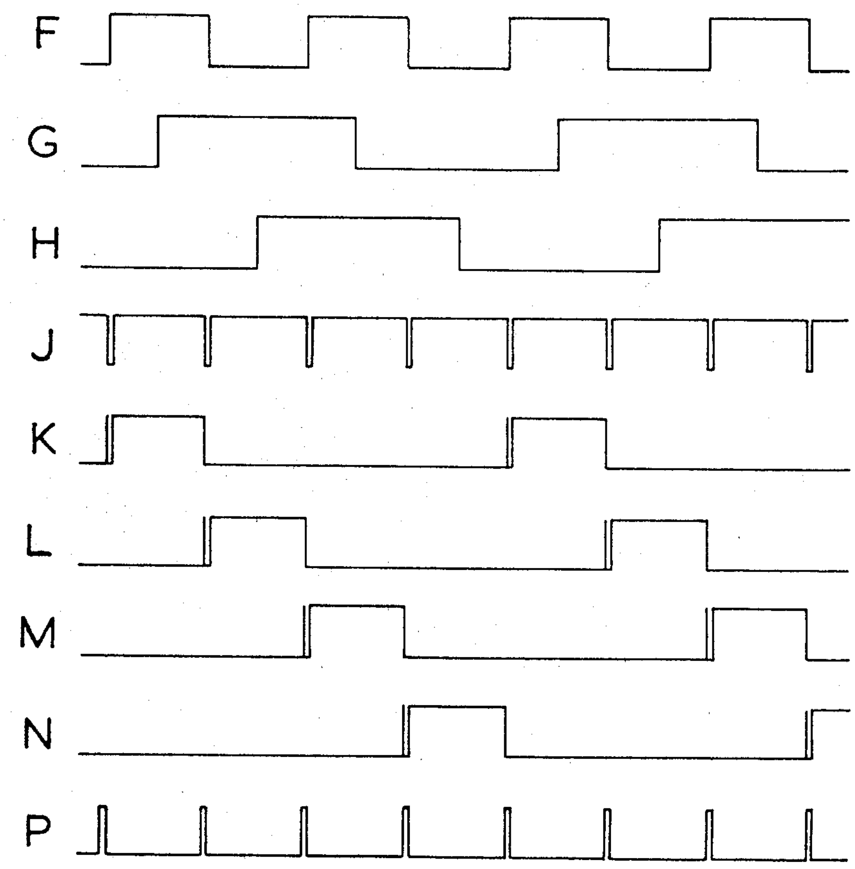
Figure 5:
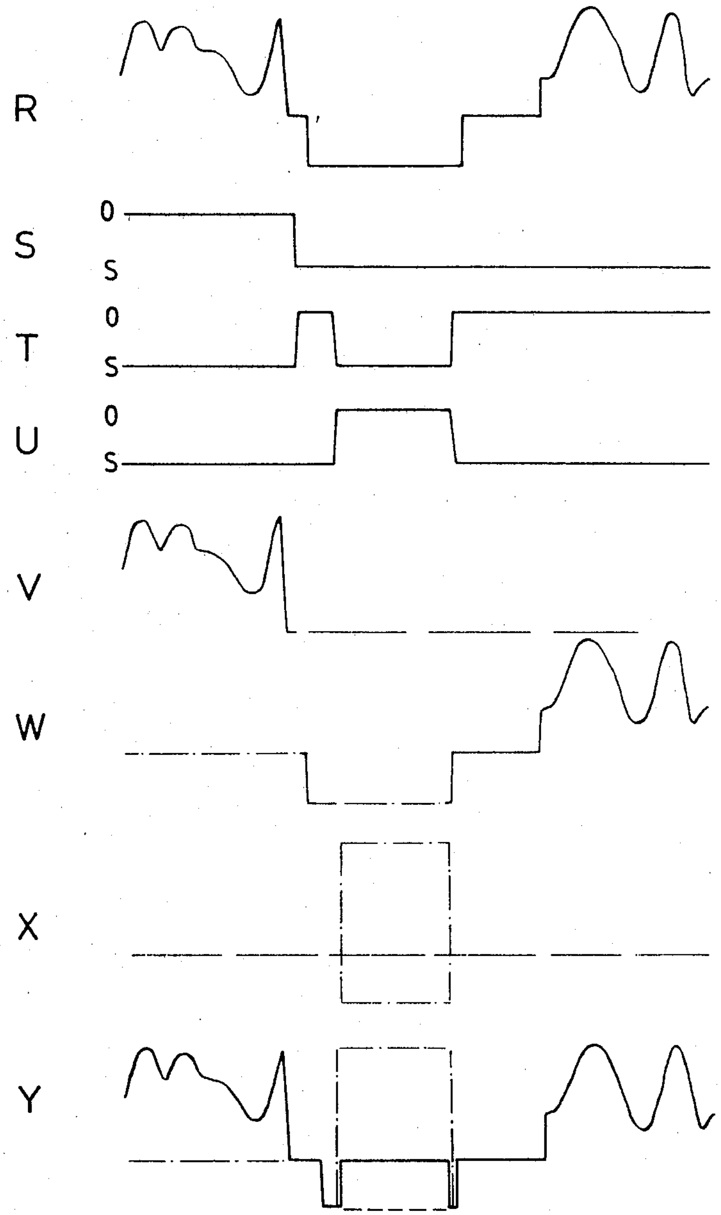
Figure 6:
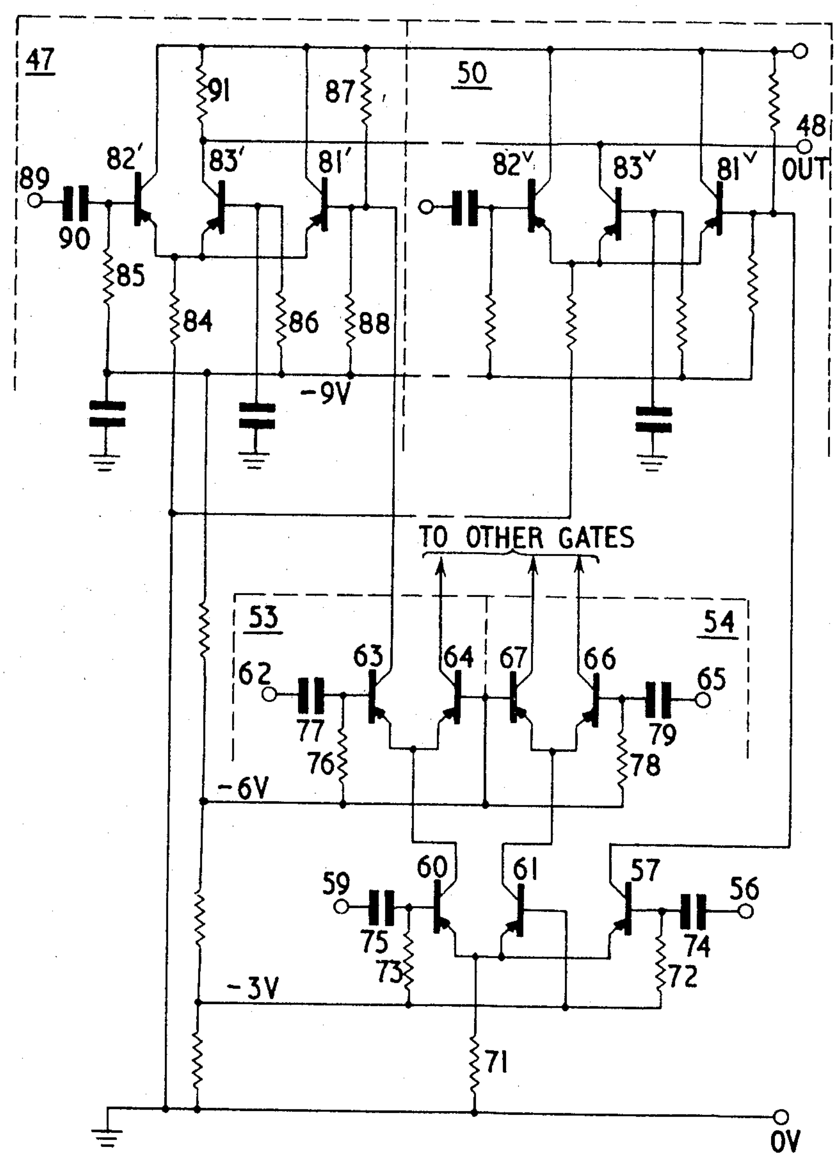

The features of the invention which are believed to be novel are set forth with particularity in the appended claims. The organisation and manner of operation of the invention, together with further objects and advantages thereof, may best be understood with reference to the following description taken in conjunction with the accompanying drawings in which like reference numerals refer to like elements in the several figures and in which:

FIGURE 1 is a block schematic diagram of apparatus according to the invention for recording a television signal on magnetic tape, FIGURE 2 comprises a series of waveform diagrams illustrating the action of the apparatus shown in FIGURE 1, FIGURE 3 is a block schematic diagram of apparatus according to the invention for reproducing a television signal which has been recorded on magnetic tape, FIGURE 4 comprises a series of waveform diagrams illustrating the action of the apparatus shown in FIGURE 3, FIGURE 5 comprises a series of waveform diagrams showing in more detail part of the operation of apparatus as described in relation to FIGURE 3, and FIGURE 6 is a circuit diagram showing a possible construction for part of the apparatus described in relation to FIGURE 3.

In the apparatus shown in FIGURE 1 a magnetic tape 1 is drawn in the direction of the arrow 2 past and in contact with the periphery of a head drum 3 carrying four magnetic transducer heads (not shown) to which connexion is made by way of a conventional slip-ring and brush assembly 5. The leads to the heads on drum 3 are taken to a switch 6 by which the heads may be connected either to the recording circuits shown in this figure or to circuits for reproducing previously recorded signals. Circuits suitable for this purpose are described below in relation to FIGURE 3.

To record signals received at an input terminal 7 the signals are first clamped to a predetermined D.C. level and then amplified, these operations being performed in known circuits indicated only as a unit 8. The clamped and amplified signals from unit 8 are then fed to a known modulator 9 in which they are applied to vary the frequency of an oscillation. The frequency-modulated oscillation thus produced in modulator 9 is fed to a drive amplifier 10 the output current is fed by way of a switch 6 to the transducer heads on drum 3, so that there is produced on tape 1 a record of the frequency-modulated oscillation in the form of record tracks extending transversely of the tape. The apparatus thus far described is well known in the art. As is known, it is in many cases advantageous to provide a separate drive amplifier for each head, so as to permit individual adjustment of amplitudes.

In order to supervise the operation of the apparatus, the modulated oscillation appearing across the transducer heads is taken by way of a gate 11, the purpose of which will be discussed below, to a demodulator 12, the output from which is fed to an oscilloscope 13, so that there appears on the screen 14 of the oscilloscope 13 a trace representing the original signal. It is very desirable to ensure that the various elements of the signal processing circuits are correctly adjusted and for this purpose, in accordance with one aspect of the present invention the signal applied from drive amplifier 10 to demodulator 12 is periodically interrupted by the closure of gate 11 and replaced by a signal of predetermined frequency applied to the input of demodulator 12 by way of another gate 15.

Gates 11 and 15 are conveniently of a known kind which is opened to allow the passage of signals when an appropriate bias is applied to a control terminal. The two gates are thus readily opened alternately by connecting their respective control terminals to the collectors of two transistors 16, 17. These transistors have their emitters connected together and earthed through a common resistor 18. The base of transistor 16 is connected to a source of bias potential such that when transistor 17 is made conductive transistor 16, which is otherwise conductive, becomes cut off.

Transistor 17 receives on its base impulses from a pulse generator 19 to which are applied the demodulated television signals from demodulator 12. Pulse generator 19 conveniently contains known circuits which separate the horizontal synchronizing component from the applied signals and develops from this component a train of impulses which occur wholly within the horizontal synchronizing pulse intervals. Gate 15 is therefore opened, by having its control terminal returned to earth by way of transistor 17 and resistor 18, and gate 11 simultaneously closed, during a part of each horizontal sychronizing interval. Gate 15 has applied to it from a standard frequency generator 20 a signal of standard frequency. This frequency may be that nominally corresponding to the black level of the signal to be recorded, or more advantageously may have in sequence the values corresponding to the peak white level and to the black level or to the level of the tips of the synchronizing signals. For this purpose standard frequency generator 20 may receive from pulse generator 19, by way of a lead shown in broken line at 21, horizontal synchronizing impulses which are used to control the sequential application to gate 15 of the various predetermined frequencies.

The result of the operation of the circuits provided in accordance with the present invention is that on the screen 14 of oscilloscope 13 there appear traces representing at least one and preferably two standard levels in the signal, specifically the black level and the peak white level of the picture signal or the level of the tips of the synchronizing impulses and the peak white level of the picture signal, thus greatly facilitating the adjustment of the equipment.

The operation of the apparatus of FIGURE 1 is now further described with reference to the waveform diagrams contained in FIGURE 2. Here waveform A represents a part of the television signal received at terminal 7. It will be seen that the signal consists of picture signal portions V, V′ and blanking intervals B, B′, within which there occur synchronizing signals S, S′. In modulator 9 this signal is converted into a frequency-modulated signal represented by waveform B in which the peak which levels of the video signal are represented by frequency $f_p$, the black levels by frequency $f_b$ and the tips of the synchronizing pulses by frequency $f_s$. When the signal from drive amplifier 10 has passed through gate 11, the signal will be interrupted during the synchronizing impulses, as shown at P, P′ in waveform C. At the same time that gate 11 closes to produce the gaps in waveform C, gate 15 opens to allow the passage of a standard frequency signal from standard frequency generator 20. The standard frequency signals are illustrated by waveform D. They may advantageously have in succession the frequencies $f_p$, $f_b$, or $f_p$, $f_s$; in the waveform illustrated successive signals have the first two frequencies respectively, the signals of other frequencies being in each case indicated for comparison by broken and chain lines.

The composite signal consisting of the gapped signal from gate 11 and the standard-frequency pulses from gate 15 is demodulated and displayed on the screen 14 of oscilloscope 13, which, for example, may be arranged to yield a display showing standard levels in effective superposition as illustrated by waveform E. It will be immediately apparent that any discrepancy between the nominal or standard levels and those actually present in the signal is thus readily detected.

In the apparatus shown in FIGURE 3 a magnetic tape 31 carrying a television signal recorded as a series of tracks extending transverely of the tape is traversed in the direction of arrow 32 by conventional means not shown past a revoluble member 33 in the form of a disc carrying four magnetic transducer heads $33_A$, $33_B$, $33_C$, $33_D$ equally spaced about its periphery. Member 33 is arranged to be rotated about its axis by means of an electric motor 34 so that as tape 31 moves past member 33 each of the recorded tracks which it carries is traversed by one of the heads $33_A$–$33_D$. The means for ensuring that heads $33_A$–$33_D$ traverse the tracks recorded on tape 31 correctly, by appropriately controlling the relative speeds of motor 34 and of the tape traversing means are well known and will not be further described. The signals thus recoverd are fed out by way of a conventional slip-ring and brush assembly 35 and thence by way of leads 36, 37, 38 and 39 respectively to preamplifiers 40, 41, 42 and 43 which as long known in the art of recording television signals may include circuit means appropriate to equalize the frequency response characteristics of the several heads.

The signals from preamplifiers 40, 41, 42 and 43 pass respectively to gate circuits 44, 45, 46 and 47 and, whenever one of these gate circuits is open, the corresponding signal will pass to an output terminal 48.

In accordance with the present invention, a standard signal generator 49 is provided for developing at least one auxiliary signal having a definite characteristic and a further gate 50 is provided whereby signals from standard signal generator 49 may be injected into the output channel by way of terminal 48 at times when none of the gates 44–47 is open.

Advantageously the signals provided by standard signal generator 49 have definite relations to the amplitude range of the recorded signal. Thus where, as is usual, the television signal is recorded as af requency modulated carrier, these signals may comprise in succession signals having frequencies corresponding to the level of the tips of the synchronizing signals, or to blanking level, and to the peak white level of the video signal. Such signals are advantageously employed in signal processing circuit arrangements to which the succession of signals recovered by heads $33_A$–$33_D$ are fed to ensure that the level of the signal and the amplitude range which it occupies are correctly adjusted.

One way of operating signal reproducing apparatus according to the invention is to arrange that gate 50 is opened at each transition from one of the heads $33_A$–$33_D$ to the next. To this end the circuit arrangement indicated by the remaining elements of FIGURE 3 may be employed. For the sake of simplicity the following description will refer only to p-n-p transistors as schematically shown in the drawing, but it will be appreciated that n-p-n transistors or thermionic valves may equally well be employed. Each of units 51, 52, 53 and 54 consists of an emitter-coupled pair of transistors with arrangements for keeping the base of one transistor at a constant potential and for applying control signals to the base of the other transistor. In unit 51 the common emitter connexion is taken by way of a resistor 55 and terminal + to the positive supply. When a negative-going control signal is applied to terminal 56 and thence to the base of one transistor 57 of unit 51, this transistor will pass current and gate 50 will be caused to open. In the absence of such a signal at terminal 56 the other transistor 58 of unit 51 is operative and, as its collector is connected to the common emitter connexion of the transistor in unit 52 this latter unit becomes operative.

When unit 52 is operative and a negative-going control signal is applied by way of its control terminal 59 to the base of transistor 60, this transistor passes current, in the absence of such a signal transistor 61 will be conductive. When transistor 60 is conductive unit 53 becomes operative, but when transistor 61 is operative unit 54 comes into play. When units 52 and 53 are operative and a negative-going control signal is applied to control terminal 62 of the latter unit transistor 63 becomes conductive and gate 47 is conductively connected to terminal 55, thus opening the gate. As the negative-going signal at terminal 62 disappears, transistor 64 of unit 53 becomes conductive so that gate 45 is conductively connected to terminal 53 and this gate therefore opens.

When unit 52 is operative, in the absence of a negative-going signal at terminal 56 of unit 51, and a negative-going signal is not applied to terminal 59 of unit 52, transistors 61 of unit 52 becomes conductive and unit 54 is thus made operative. In the presence of a negative-going signal at terminal 65 of unit 54, transistor 66 becomes conductive, thus opening gate 44, while in the absence of such a signal transistor 67 conducts to open gate 46.

In operation a conventional pulse generator, operated by signals locked to the rotation of member 33 and by synchronizing signals contained in the reproduced signal, is used to generate switching signals for application to terminals 56, 59, 62 and 65. These signals are illustrated by the waveform diagrams of FIGURE 4 where waveform F represents the signal applied to terminal 59, waveform G that applied to terminal 62, waveform H that applied to terminal 65 and waveform J the signal applied to terminal 56. Examination of these waveforms in the light of the above description of the operation of the gating system will show that gates 44, 45, 46 and 47 will open cyclically in the order stated while gate 50 will open at the commencement of each gate-opening period of gates 44–47. The timing of the pulses of waveform J is such that they occur very shortly after the opening of each of gates 44–47, which thus open briefly and then close for the duration of one of the pulses of waveform J, after which they re-open for the remainder of the normal period, as indicated by waveforms 4L–4N respectively, while gate 50 opens once for each of the gating periods of gates 44–47, as indicated by waveform 2D.

The exact timing of the pulses of waveform 2J in relation to the television signal being reproduced is illustrated by the waveforms of FIGURE 5, which are drawn to a common time-scale and in which waveform R illustrates the waveform of a portion of a television signal including a horizontal synchronizing impulse, which is assumed to be the first such impulse recovered by one of transducer heads $33_A$–$33_D$ of FIGURE 3, after it has engaged a record track on the tape. It is arranged that the change-over from one head to another occurs during the "front porch" preceding the synchronizing impulse. Thus waveform S respresents the condition of that gate which controls the signal of a preceding head, the levels "O" and "S" representing respectively the open and shut conditions while waveform T similarly represents the condition of the gate controlling signals from the immediately succeeding head and waveform U represents the condition of gate 50 which controls the injection of the auxiliary signals from generator 49.

The operation of the gates is illustrated by waveforms V and W of which waveform V represents the signal passing to the common output terminal 48 of FIGURE 3 by way of the preceding gate controlled by the signal of waveform S and waveform W represents the signals fed out by way of the succeeding gate controlled by waveform T and waveform X represents the signal injected through gate 50 controlled by waveform U. Waveform Y represents the combined output signal appearing at terminal 48 of FIGURE 3, containing the injected auxiliary signal of standard level.

It will be seen that the injected signal occurs wholly within the period of the horizontal synchronizing impulse and that the injected signal may have frequencies corresponding to each in turn of a number of different levels. Conveniently two levels are employed, the frequencies corresponding to which are preferably injected in rotation, these may correspond to the black level (indicated in full line in waveforms X and Y), or to the level of the tips of the synchronizing signals (shown in broken line), and to the peak white levels (indicated in chain line). Signal generator 49 may thus be arranged to develop output signals having frequencies corresponding to each of the chosen levels in alternation. Alternatively signal generator 49 may produce signals having the frequencies corresponding to all three of these levels in a continuous succession which may repeat for every three heads taken into use or for every three lines in the reproduced television signal. In this latter case a standard-frequency pulse will occur during every horizontal synchronizing impulse, while in the former case a standard-frequency pulse will occur only during the first horizontal synchronizing impulse to occur subsequent to a head becoming operative to reproduce the recorded signal.

Standard signal generator 49 may thus comprise a known-binary or ring-of-three counter circuit arranged to select each in turn of the chosen standard frequencies for application to gate 50 under the control of signals repetitive either at the head repetition rate or at the repetition rate of the horizontal synchronizing impulses. Pulses at the head repetition rate may be derived from a known device including a patterned member rotating with the shaft of driving motor 45. Pulses repetitive at the horizontal synchronizing frequency may be obtained by selecting these impulses in known manner from the reproduced signals.

FIGURE 6 shows in more detail circuits suitable for performing the functions of gate circuits 44–50 and units 51–54 of FIGURE 3. Here units 51, 52 are combined by connecting the emitters of transistors 57, 60 and 61 together and to earth by way of a common resistor 71. The bases of transistors 57 and 60 are returned by way of respective resistors 72, 73 to a bias potential of −3 v. obtained from a voltage divider chain which will not be discussed in detail, while the base of transistor 61 is returned directly to this bias potential. Thus transistor 61 is conductive unless a negative-going signal is received at terminal 56 or 59 and is thus fed by way of one of coupling capacitors 74, 75 to the base of transistor 57 or 60 to render that transistor conductive. When transistor 60 is thus made conductive transistor 61 is cut off and transistor 57 remains cut off.

As transistor 60 is now conductive it becomes possible for one of transistors 63, 64 (contained in unit 53 of FIGURE 3) to pass current the emitters of these transistors are connected together and to the collector of transistor 60, while the base of transistor 63 is returned by a way of a resistor 76 to a −6 v. bias potential, to which the base of transistor 64 is returned directly. Which of these transistor does pass current is determined by the potential applied to terminal 62 and thence by way of a coupling capacitor 71 to the base of transistor 63. If a negative pulse is present at terminal 62, transistor 63 will become conductive, otherwise transistor 64 will conduct.

The collector of transistor 63 is connected to the base of a transistor 81' which forms a part of gate unit 47 of FIGURE 3. Transistor 81' has its emitter connected to those of two other transistors 82', 83' and returned to the positive, earthed terminal of a 12 v. supply by way of a common resistor 84. The bases of transistors 82, 83 are returned by way of respective resistors 85, 86 to a −9 v. auto-bias line, while that of transistor 81 is connected by way of respective resistors 87, 88 to the −12 v. supply and to the −9 v. auto-bias line. The values of resistors 87, 88 are so chosen that transistor 81 is normally conductive and transistors 82, 83 are thus cut off. When transistor 63 conducts, the base potential of transistor 81 is taken positive to an extent sufficient to cause the transistor to be cut off. Transistor 82, 83 then acts as an emitter-coupled pair, signals received at an input terminal 89 being applied by way of a capacitor 90 to the base of transistor 82 and appearing across the collector load resistor 91 of transistor 83, whence they are taken to an output terminal 48.

Only one other gate is illustrated, this is gate 50 of FIGURE 3, which becomes operative whenever a negative-going pulse is applied to terminal 56 to cause transistor 57 to pass current. Gate 50 comprises transistors $81^V$, $82^V$ and $83^V$ which are connected and operate exactly similarly to transistors 81'–83'. Transistor $83^V$ shared the load resistor 91 of transistor 83. The remaining gates 44–46 are constructed exactly similarly and are similarly opened when transistors 66, 64 and 67 respectively become conductive. Transistors 66, 67 have their emitters connected together and to the collector of transistor 61. Thus whenever transistor 61 is conductive one or other of transistors 66, 67 will also conduct, depending upon whether a negative-going potential applied from terminal 65 to the base of transistor 66 by way of a coupling capacitor 79 has overcome the voltage drop in resistor 78 by which the base of that transistor is returned to the −6 v. bias line.

All the gates share the same load resistor 71, so that the output signals from all the gates appear at output terminal 48 as described in relation to FIGURE 3.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. Magnetic tape apparatus comprising, in combination: a magnetic tape; drive means for traversing said tape through a recording position; a rotating member at said recording position carrying a transducer head; guide means at said recording position constraining said tape to embrace said member whereby said transducer head engages said tape in tracks extending transversely thereof; a source of a signal to be recorded; a modulator providing an output signal of which the frequency varies within a predetermined modulation range in accordance with a predetermined characteristic of an applied signal; circuit means for applying said signal to be recorded to said modulator; a signal channel connecting said output signal to said transducer head; a signal generator yielding a standard signal having a frequency within said modulation range; a frequency demodulator having input and output terminals; an oscilloscope; means connecting the output of said demodulator to said oscilloscope; first gating means operable to connect said demodulator input terminal to said signal channel; second gating means operable to connect said demodulator input terminal to said signal generator; and gate control means opening said first and second gating means alternately to cause said standard signal to be periodically applied to said demodulator in place of said modulator output signal.

2. Magentic tape apparatus according to claim 1 for recording a television signal in which said gate control means comprises means for developing from applied television signals a series of impulses which occur wholly within the horizontal synchronizing pulse intervals, together with means for applying said impulses to a trigger circuit yielding gate control impulses of opposite polarity to said first and second gating means.

3. Magnetic tape apparatus comprising, in combination: a magnetic tape; drive means for traversing said tape through a recording position; a rotating member at said recording position carrying a plurality of transducer heads; guide means at said recording position constraining said tape to embrace said member whereby said transducer heads engage said tape in a succession of record tracks extending transversely thereof; a source of a television signal to be recorded; a modulator providing an output signal of which the frequency varies within a predetermined modulation range in accordance with the amplitude of an applied signal; means connecting said television signal to the input of said modulator; an amplifier having an input and an output; means connecting the output of said modulator to the input of said amplifier; means connecting the output of said amplifier to said transducer heads; a frequency demodulator having an input and an output; an oscilloscope; means connecting the output of said demodulator to said oscilloscope; first gating means operable to connect the output of said amplifier to the input of said demodulator; a signal generator yielding in response to pulse signals applied to an input thereof standard signals having in sequence frequencies corresponding to each in turn of a plurality of predetermined levels of said television signal; a pulse generator yielding in response to an applied television signal pulses occurring wholly within the horizontal synchronizing impulses of said television signal; means for applying the output of said demodulator to said pulse generator; circuit means connecting the output of said pulse generator to said signal generator; second gating means operable to connect the output of said signal generator to said demodulator; gating control means operable by applied pulses to close said first gating means and open said second gating means; and circuit means connecting the output of said pulse generator to said gate control means.

4. Magnetic tape apparatus according to claim 3 in which said gating control means comprises a pair of transistors having a common emitter lead, a resistor connected between said emitter lead and a terminal of a supply, a bias source maintaining the base of one said transistor at a potential intermediate the potentials of said voltage pulses and circuit means connecting the collectors of said transistors each to a respective one of said gating means.

5. Magnetic tape apparatus comprising, in combination: a magnetic tape carrying in tracks extending transversely thereof a magnetic record of a frequency-modulated signal having a predetermined modulation range; drive means for traversing said tape through a reproducing position; a rotating member at said reproducing position carrying a transducer head; guide means at said reproducing position constraining said tape to embrace said member, whereby said transducer engages said tape along said tracks to reproduce said signal therefrom; an output terminal; first gating means operable to pass said reproduced signal to said output terminal; a signal generator yielding a standard signal having a predetermined frequency within said modulation range; second gating means operable to connect said standard signal to said output terminal; and gate control means operating said first and second gating means to connect said reproduced signal and said standard signal alternately to said output terminal.

6. Magnetic tape apparatus comprising, in combination: a magnetic tape carrying in tracks extending transversely thereof a magnetic record of a frequency-modulated signal having a predetermined modulation range; drive means for traversing said tape through a reproducing position; a rotating member at said reproducing position carrying a plurality of transducer heads; guide means at said reproducing position constraining said tape to embrace said member whereby said transducer heads engage said record tracks in succession to reproduce said signal therefrom; an output terminal; a plurality of gating means each operable to connect a respective one of said transducer heads to said output terminal; a signal generator yielding a standard signal having a frequency within said modulation range; further gating means operable to connect said signal generator to said output terminal; and gate control means operating said gating means to cause said standard signal to be connected to said output terminal in place of said reproduced signal during a portion of the period in which each said transducer head is operative.

7. In magnetic tape apparatus including four transducer heads successively operative at a predetermined rate to reproduce a recorded television signal, head switching means comprising, in combination: three primary control transistors having a common emitter lead; a direct voltage supply having first and second terminals; an impedance connecting said lead to said first terminal of said direct voltage supply; individual impedances connecting the bases of a first and a third of said three transistors to a common first bias source; a direct connection from the base of a second of said three transistors to said first bias source; a source of first control signals comprising a square voltage wave having a periodicity equal to half the rate at which said heads become operative; circuit means connecting said source to the base of said first transistor; a source of second control signals comprising voltage impulses occurring wholly within the horizontal synchronizing impulses of said television signal and at a repetition rate equal to the rate at which said heads become operative; circuit means connecting said second control signals to the base of said third transistor; two pairs of secondary control transistors, each said pair having a common emitter lead; a direct connection from the collector of each of said first and second primary control transistors to the common emitter lead of a respective pair of said secondary control transistors; individual impedances connecting the base of a first of each said pair of secondary control transistors to a second common bias source; a direct connection from the base of a second of each said pair of secondary control transistors to said second bias source; a source of third and fourth control signals comprising like, antiphased voltage square waves having a periodicity equal to one quarter half the rate at which said heads become operative; circuit means connecting said third and fourth control signals to the base of a respective first transistor in each of said pairs; five gating circuits each comprising a triad of transistors having a common emitter lead; individual impedances connecting each said common emitter lead to said first terminal of said supply; individual impedances connecting the base of each transistor in a said triad to a third common source of bias potential; a signal channel from each said transducer head to the base of a first transistor in an individual one of four of said triads; a source of standard signals having a characteristic corresponding to a predetermined level in said television signal; circuit means connecting said standard signal source to the base of a first transistor in the remaining said triad; a direct connection between the collector of a second transistor in each said triad and a common output terminal; a load impedance connecting said output terminal to the second terminal of said supply; a direct connection between the collector of said first and the third transistor in each said triad and said second terminal of said supply; individual impedances connecting the base of said third transistor of each said triad to said second terminal of said supply; individual direct connections between the base of said third transistor in said four triads and the collector of a corresponding one of said secondary control transistors; and a direct connection between the base of said third transistor in said remaining triad and the collector of said third of said primary control transistors.

8. Magnetic tape apparatus according to claim 7 in which said first bias source provides a potential intermediate between those of said first and second terminals of said supply, said second bias source provides a potential intermediate between that of said first bias source and that of said second terminal of said supply and said third bias source provides a potential intermediate between those of said second bias source and said second temrinal of said supply.

9. Magnetic tape apparatus according to claim 7 in which said television signal is recorded as a frequency modulated signal and said source of standard signals develops in succession a plurality of signals each having a frequency corresponding to a predetermined level in said television signal.

10. Magnetic tape apparatus according to claim 7 in which said source of standard signals develops in succession a signal having a characteristic corresponding to the peak white level of said television signal and a signal corresponding to the black level of said television signal.

11. Magnetic tape apparatus according to claim 7 in which said source of standard signals develops in succession a signal having a characteristic corresponding to the peak white level of said television signal and to the tips of the synchronizing impulses of said television signal.

No references cited.

DAVID G. REDINBAUGH, *Primary Examiner.*

H. W. BRITTON, *Assistant Examiner.*